(12) United States Patent
Bjorke

(10) Patent No.: US 7,898,543 B1
(45) Date of Patent: Mar. 1, 2011

(54) SYSTEM AND METHOD FOR OPTIMIZING TEXTURE RETRIEVAL OPERATIONS

(75) Inventor: Kevin Bjorke, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 759 days.

(21) Appl. No.: 11/402,090

(22) Filed: Apr. 10, 2006

(51) Int. Cl.
*G06F 15/00* (2006.01)
*G09G 5/00* (2006.01)
*G06T 1/00* (2006.01)

(52) U.S. Cl. .......................... 345/501; 345/582

(58) Field of Classification Search ............ 345/501, 345/582
See application file for complete search history.

(56) References Cited

U.S. PATENT DOCUMENTS

| | | | |
|---|---|---|---|
| 5,299,309 A * | 3/1994 | Kuo et al. ............ | 345/541 |
| 6,040,837 A * | 3/2000 | Wong et al. ........... | 345/586 |
| 6,184,894 B1 * | 2/2001 | Rosman et al. ........ | 345/582 |
| 6,259,461 B1 * | 7/2001 | Brown ................. | 345/556 |
| 2002/0089512 A1 * | 7/2002 | Slade et al. .......... | 345/582 |
| 2003/0112237 A1 * | 6/2003 | Corbetta .............. | 345/426 |
| 2004/0066385 A1 * | 4/2004 | Kilgard et al. ........ | 345/506 |
| 2007/0182753 A1 * | 8/2007 | Isidoro et al. ........ | 345/587 |

OTHER PUBLICATIONS

Govindaraju et al. "Fast Computation of Database Operations using Graphics Processors" (SIGMOD 2004 Jun. 13-18, 2004, Paris, France pp. 200-211).*
Gerasimov et al. "Shader Model 3.0 Using Vertex Textures" (nVidia Whitepaper Jun. 24, 2004).*
Kevin Wu "Rational-Linear Interpolation of Texture Coordinates and Their Partial Derivatives" (Hewlett Packard Jun. 1998).*
Paul Heckbert "Texture Mapping Polygons in Perspective" (NYIT Technical Memo No. 13 Apr. 28, 1983).*

* cited by examiner

*Primary Examiner* — Daniel Washburn
(74) *Attorney, Agent, or Firm* — Zilka-Kotab, PC

(57) ABSTRACT

A system, method, and computer program product are provided for carrying out texture retrieval operations. In use, it is determined whether at least one texture retrieval operation is to be performed in a predetermined mode. Based on such determination, the texture retrieval operation is performed utilizing predetermined derivatives.

19 Claims, 5 Drawing Sheets

SYSTEM AND METHOD FOR OPTIMIZING TEXTURE RETRIEVAL OPERATIONS

FIELD OF THE INVENTION

The present invention relates to graphics processors, and more particularly to retrieving texture data from memory using a graphics processor.

BACKGROUND

Typical graphics processors are equipped with both vertex and pixel shaders for determining surface properties of vertices and pixels (or fragments, etc.), respectively. There has been a recent trend of equipping both vertex and pixel shaders with common functionality.

For example, one operation typically reserved for pixel shaders is the retrieval of texture information from memory for texturing a pixel surface, etc. Recently, however, vertex shaders have been equipped with similar functionality, namely vertex texture retrieval operations (e.g. "vertex texture fetches," etc.). Unfortunately, such vertex texture retrieval operations are inherently less efficient than accessing texture information using the pixel shader. This is due, at least in part, to the fact that local partial derivatives typically associated with a width of a desired texture access are unknown in advance of pixel processing.

In other words, vertex-related data is typically "wild" in that there is not necessarily any intrinsic coherence between vertices during processing. To this end, each vertex texture retrieval operation typically must provide arbitrarily-determined partial derivatives for the associated retrieval. Further, due to the aforementioned lack of coherence, an associated texturing system can not always benefit from caching texture results for later reuse. Such features have a possible net effect of a significant lag (e.g. numerous clock cycles, etc.) for each vertex texture retrieval operation.

There is thus a need for overcoming these and/or other problems associated with the prior art.

SUMMARY

A system, method, and computer program product are provided for carrying out texture retrieval operations. In use, it is determined whether at least one texture retrieval operation is to be performed in a predetermined mode. Based on such determination, the texture retrieval operation is performed utilizing predetermined derivatives.

DETAILED DESCRIPTION

Figure 1:
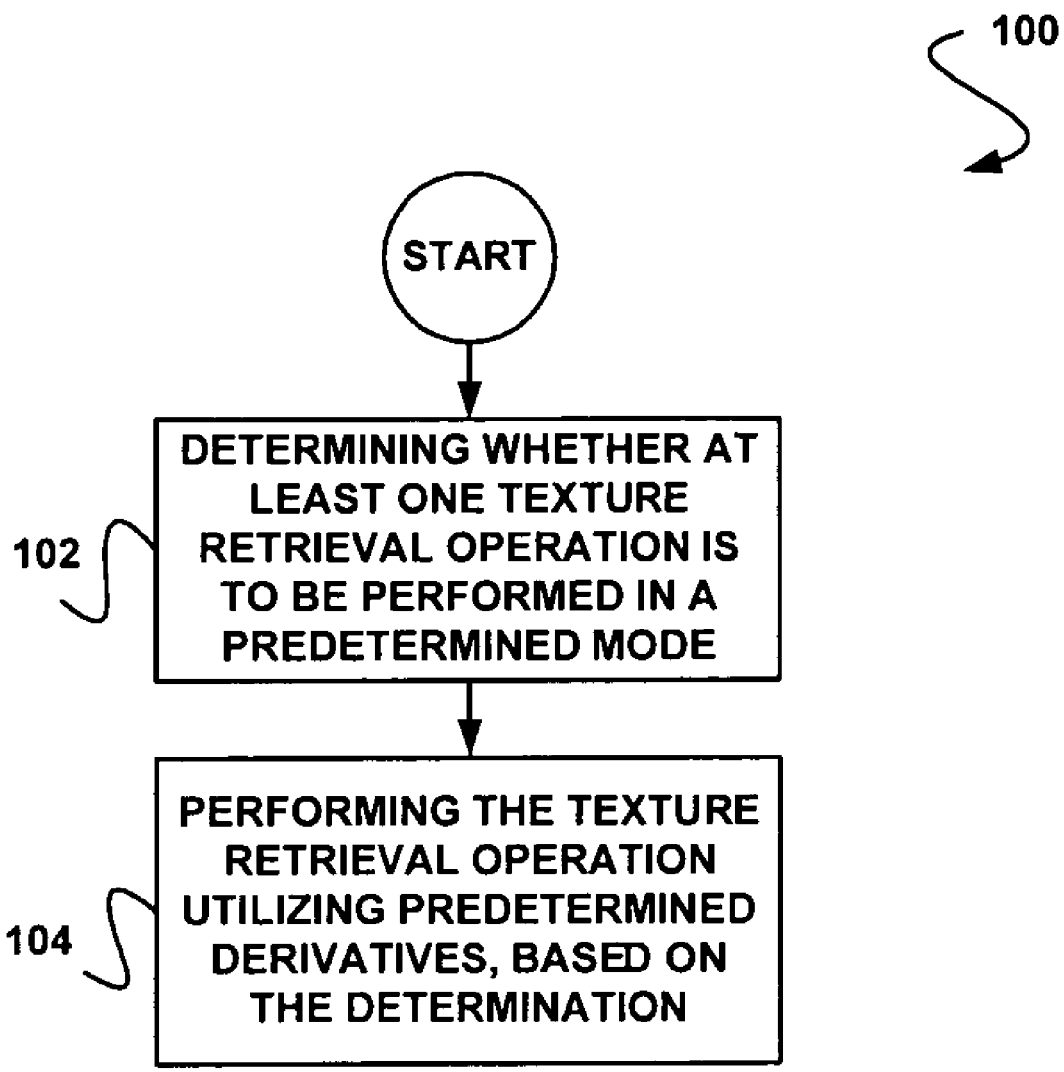
FIG. 1 shows a method for performing texture retrieval operations, in accordance with one embodiment.

FIG. 1 shows a method 100 for performing texture retrieval operations, in accordance with one embodiment. As shown, it is first determined whether at least one texture retrieval operation is to be performed in a predetermined mode (e.g. an optimized mode and/or any other mode, etc.). See operation 102. In the context of the present description, such texture retrieval operation refers to any operation that results in the retrieval of texture-related information (e.g. textures, information used for texturing, etc.).

Further, such texture retrieval operation may be performed by any desired graphics-related processing module. Just by way of example, the texture retrieval operation may be performed by a vertex shader, a pixel shader, any other shader (e.g. texture, geometry, etc.), and/or any other portion of a graphics pipeline.

Strictly as an option, the determination may be made utilizing a data structure. Such data structure may, in some embodiments, include a flag that is accessible via an application program interface (API), or the like. Of course, it is contemplated that the determination may further be performed by any another manual and/or automated mechanism (e.g. a driver, etc.).

Next, in operation 104, the texture retrieval operation may be performed utilizing predetermined derivatives, based on the determination of operation 102. In one embodiment, the derivatives may include fixed, linear, partial, non-arbitrarily generated, and/or any other types of derivatives, for that matter.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Specifically, in the context of one possible implementation of operation 104, the aforementioned texture retrieval operation may be performed utilizing the predetermined derivatives, if it is determined that the at least one texture retrieval operation is to be performed in the predetermined mode. On the other hand, the texture retrieval operation may be performed utilizing arbitrarily generated derivatives, if it is determined that the at least one texture retrieval operation is not to be performed in the predetermined mode.

To this end, when operating in the predetermined mode, the at least one texture retrieval operation is capable of being optimized when performing particular operations by various graphics processing modules. For example, when accessing texture information using a vertex shader during the course of general purpose computation on a graphics processing unit (GPGPU), managing/using vertex texture arrays (VTA's), and/or in the context of any situation where there is a one-to-one correspondence between an input and an output of the vertex shader processing; the use of predetermined derivatives that leverage such alignment may be used for avoiding caching/filtering, and/or for providing any other desired optimization. Of course, it is contemplated that such predetermined mode may also be desired in other scenarios. Again, more illustrative information regarding these and other exemplary features will now be set forth.

Figure 2:
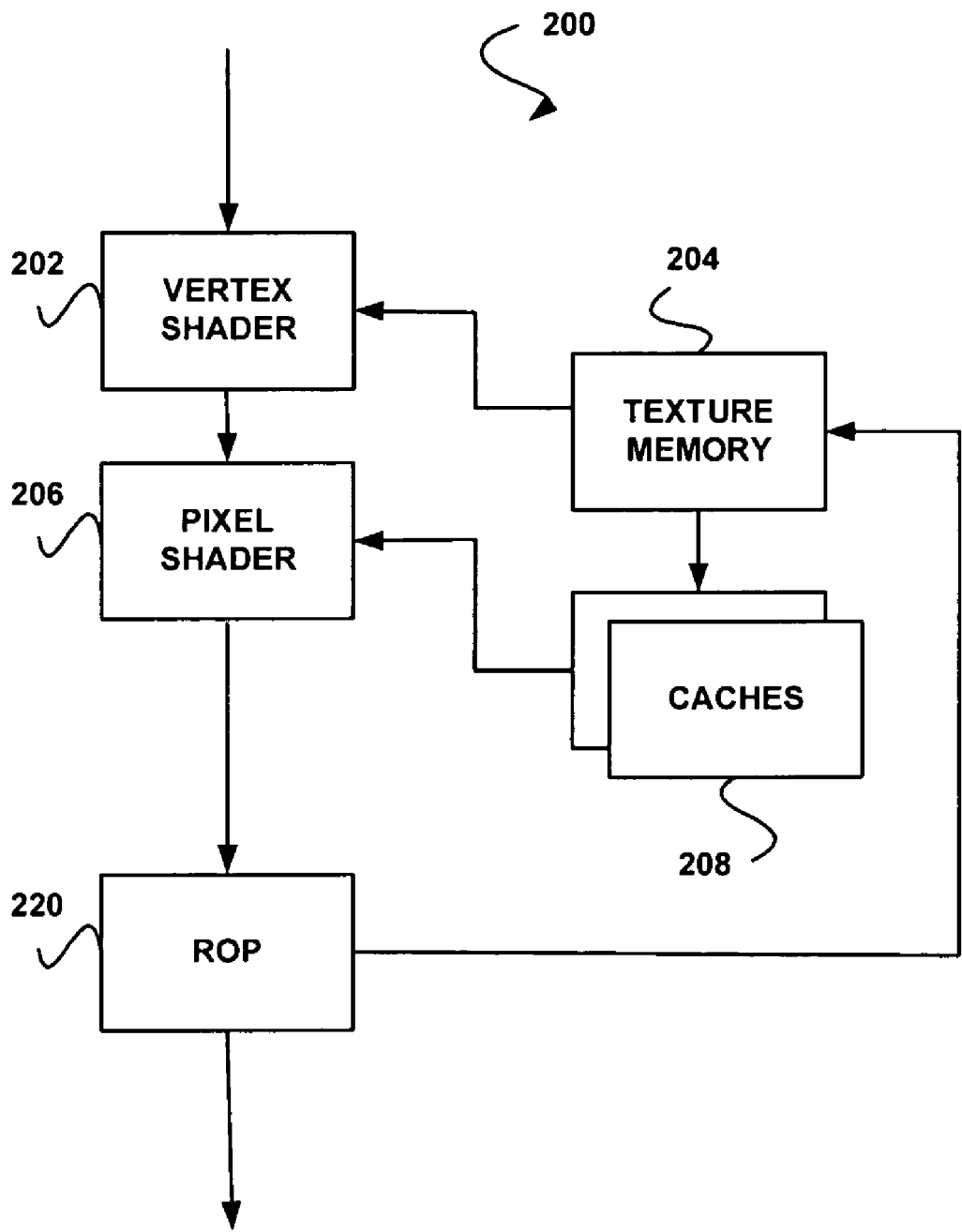
FIG. 2 shows a system for performing texture retrieval operations, in accordance with one embodiment.

FIG. 2 shows a system 200 for performing texture retrieval operations, in accordance with one embodiment. As an option, the present system 200 may be implemented to carry out the method 100 of FIG. 1. Of course, however, the system 200 may be implemented in any desired environment.

As shown, the system 200 includes a vertex shader 202 for determining surface properties of vertices. Subsequent to and in communication with the vertex shader 202 is a pixel shader 206 for determining surface properties of pixels (or fragments, etc.). While vertex and pixel shaders are shown, it should be noted that various other unillustrated shaders may further be included in the form of geometry shaders, texture shaders, etc. Still yet, it should also be noted that, while a single instance of the vertex shader 202 and pixel shader 206 are shown in FIG. 2, multiple instances may also exist, as desired.

To accomplish the foregoing functionality, the vertex shader 202 and pixel shader 206 may retrieve textures from texture memory 204. Such textures may, in turn, be used for the purpose of texturing surfaces of vertices, pixels, etc. In other words, such textures (which may take the form of an image file, etc.) may be used to add complex patterns to the surfaces of objects in a scene to simulate walls, the sky, and/or any other detailed feature thereof.

Further, during use of the pixel shader 206, in particular, an additional one or more caches 208 may be used to cache the textures received from the texture memory 204. Specifically, such caches 208 may be used to store textures associated with previous frames, so that similarities may be identified with respect to current frames. When such similarities are found, the textures associated with the previous frames may be used in lieu of initiating additional texture retrieval operations, various compression techniques may be employed, multiple samples may be weighted, etc. for enhancing operation and efficiencies.

The aforementioned shaders, in turn, feed a raster-operation (ROP) module 220 for performing various alpha and z-buffering tests involving graphics data processed by the different previous shaders. Still yet, the ROP module 220 may feedback additional textures into the texture memory 204 such that such textures may be reused, as desired by the vertex shader 202 and pixel shader 206. To this end, the processed graphics data is stored in a frame buffer (not shown) which, in turn, is used to refresh frames depicted utilizing a display (not shown).

In use, the vertex shader 202 may be configured to carry out the method 100 of FIG. 1. Specifically, upon receipt of vertices for shading purposes, the vertex shader 202 may determine an appropriate mode of operation by reviewing an appropriate API flag or the like. If the shading operations are to be performed on input that is aligned with an output thereof, etc., derivatives associated with a width of a desired texture access may be predetermined, such that filtering, caching, calculation of arbitrary derivatives, may be optionally avoided.

As mentioned earlier, such alignment arises during GPGPU, while managing/using VTA's, in the context of any situation where there is a one-to-one correspondence between an input and an output of the vertex shader processing, as well as other contexts. It should be noted that, when managing/using VTA's, the pixel shader 206 sometimes renders an image into the texture memory 204, and resultant data is recycled into the vertex shader 202 in the form of a rectangular and/or regular array of vertex data.

Of course, if such alignment (and the optimization opportunity) does not exist, the texture retrieval operation may be performed utilizing arbitrarily generated derivatives. More illustrative information regarding various exemplary details associated with such use will now be set forth.

Figure 3:
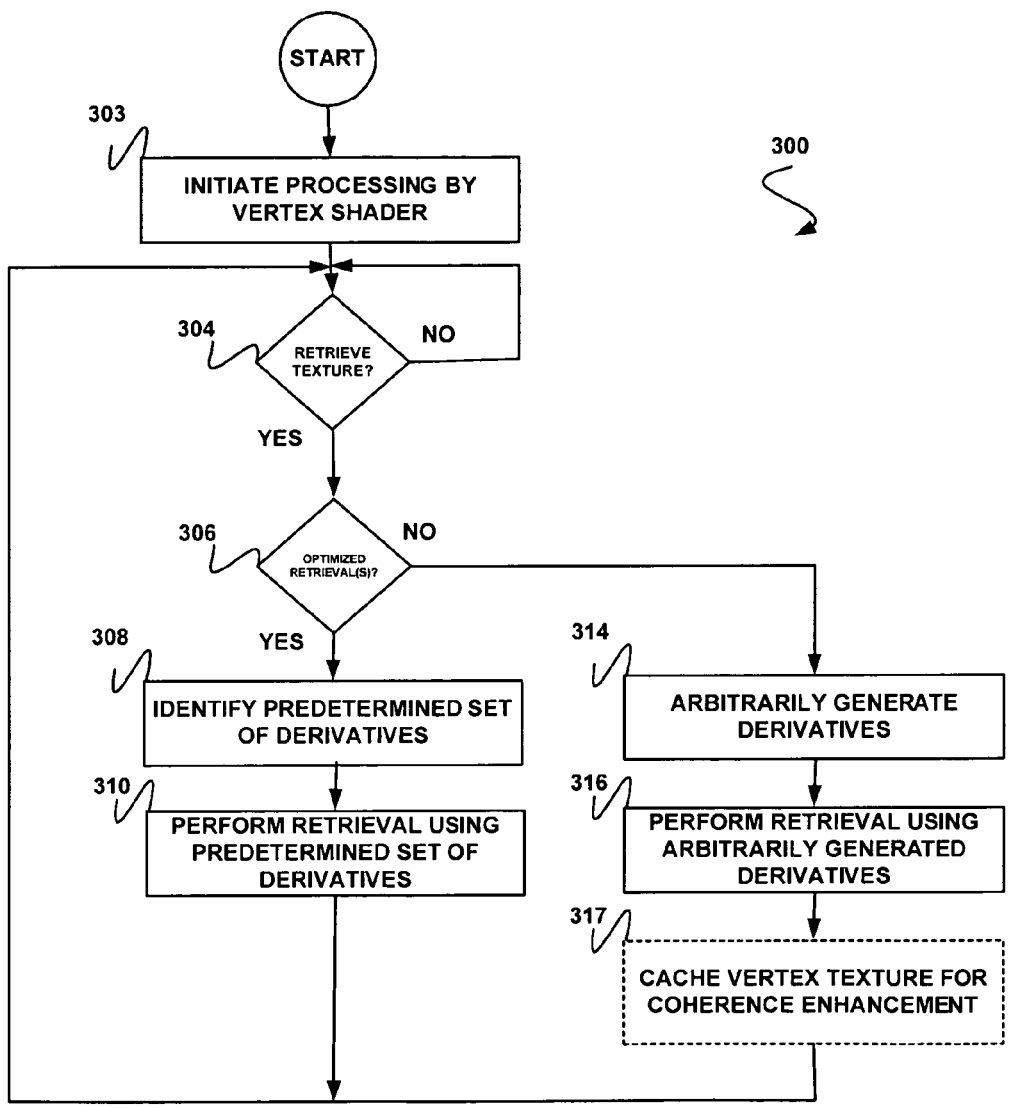
FIG. 3 shows a method for performing texture retrieval operations, in accordance with another embodiment.

FIG. 3 shows a method 300 for performing texture retrieval operations, in accordance with another embodiment. As an option, the present method 300 may be implemented in the context of the functionality and architecture of FIGS. 1-2. Of course, however, the method 300 may be carried out in any desired environment.

As shown, vertex shader processing is initiated, as indicated in operation 303. Next, it is determined whether a texture retrieval operation is necessary. See operation 304. The method 300 continues when such texture retrieval operation is initiated, by an additional determination as to whether such texture retrieval operation is being carried out in a predetermined optimized mode. See decision 306.

As mentioned earlier, such determination may be made by simply reviewing a flag associated with an API (or any other data structure, for that matter). For example, when such flag=1, it may be assumed that the texture retrieval operation is to be carried out in a predetermined optimized mode; and when such flag=0, it may be assumed that the texture retrieval operation is to be carried out in a non-optimized mode. Of course, additional modes may be used, if desired, in which case a multiple-bit flag may be required.

It should be further noted that the determination of decision 306 may be made for a plurality of texture retrieval operations associated with a particular frame, scene, etc. In such embodiment, the predetermination of the derivatives may indicate that all subsequent accesses from a particular data stream and/or texture (for the remainder of the frame, etc.) are to use the optimized mode. Of course, it is also contemplated that the determination of decision 306 may be carried out in any desired manner. For example, the decision 306 may conceivably be performed for each texture retrieval operation.

When operating in the non-optimized mode per decision 306, the method 300 may proceed by generating arbitrarily generating partial derivatives which define a width of a desired texture retrieval operation. Note operation 314. Given such partial derivatives, the necessary texture retrieval operation(s) may be performed, per operation 316. Strictly as an option, the retrieved textures may be cached for the purpose of performing some of the coherence enhancements discussed hereinabove. Note operation 317.

With reference back to decision 306, when it is determined that the method 300 is operating in the optimized mode, the method 300 may proceed by identifying a predetermined set of derivatives. See operation 308. In one embodiment, such predetermined set of derivatives may reflect the alignment between an associated output/input of a vertex shader (e.g. see, for example, the vertex shader 202 of FIG. 2, etc.).

Table 1 illustrates one exemplary set of predetermined derivatives. An example of alignment that may be leveraged by use of such derivatives will be set forth in greater detail during reference to FIG. 4.

TABLE 1

$ddx = 1/xres$
$ddy = 1/yres$

Of course, such derivatives are set forth illustrative purposes only and should not be construed as limiting in any manner. For example, in some embodiments, any non-arbitrarily generated derivatives may be used as predetermined derivatives, for that matter.

Once identified, the predetermined set of derivatives may be used to perform the texture retrieval operation. See operation 310. Thus, the filtering associated with operation 314 may be avoided as well as any associated caching, etc., thereby optimizing numerical operations in certain situations that warrant the same.

Figure 4:
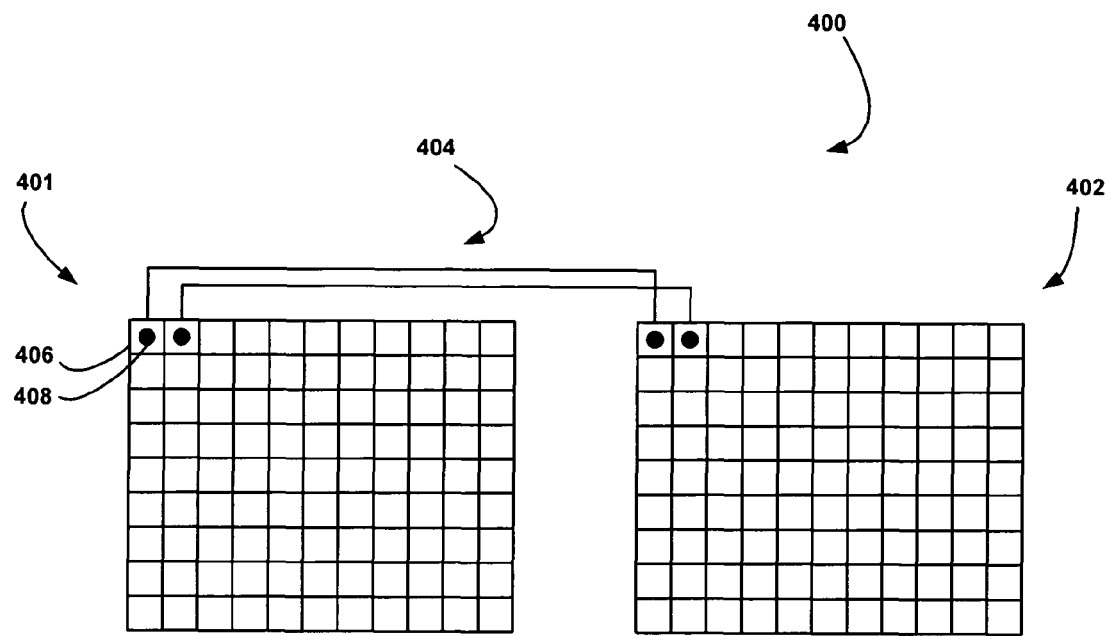
FIG. 4 shows an alignment that may be exploited for performing optimized texture retrieval operations, in accordance with another embodiment.

FIG. 4 shows an alignment 400 that may be exploited for performing optimized texture retrieval operations, in accordance with another embodiment. As an option, the present alignment 400 may be leveraged in the context of the architecture and functionality of FIGS. 1-3. Of course, however, such alignment 400 should not be construed as limiting in any manner.

As shown, an input image 401 is provided in a side-by-side relationship with an output image 402. Such input image 401 and output image 402 are illustrated to include the same dimensions (e.g. X pixels-by-Y pixels, same number of pixels, etc.). Further, there is a one-to-one correspondence 404 between the respective pixels 406 and respective texture samples 408.

When repeatedly processing images or like in situation such as GPGPU applications, such images are typically aligned from pass to pass, either exactly aligned texel-to-pixel (as in most basic image processing) or, at a minimum, aligned along their respective axes with a known, fixed, scaling relationship (e.g. for a reduction of one array to a similar smaller array, etc.). In such cases, a single set of derivatives may be assigned to a texture before accessing the same utilizing the vertex shader. Access of the texture may thus be guaranteed to be aligned to processing order with a 100% predictable access pattern, etc.

Figure 5:
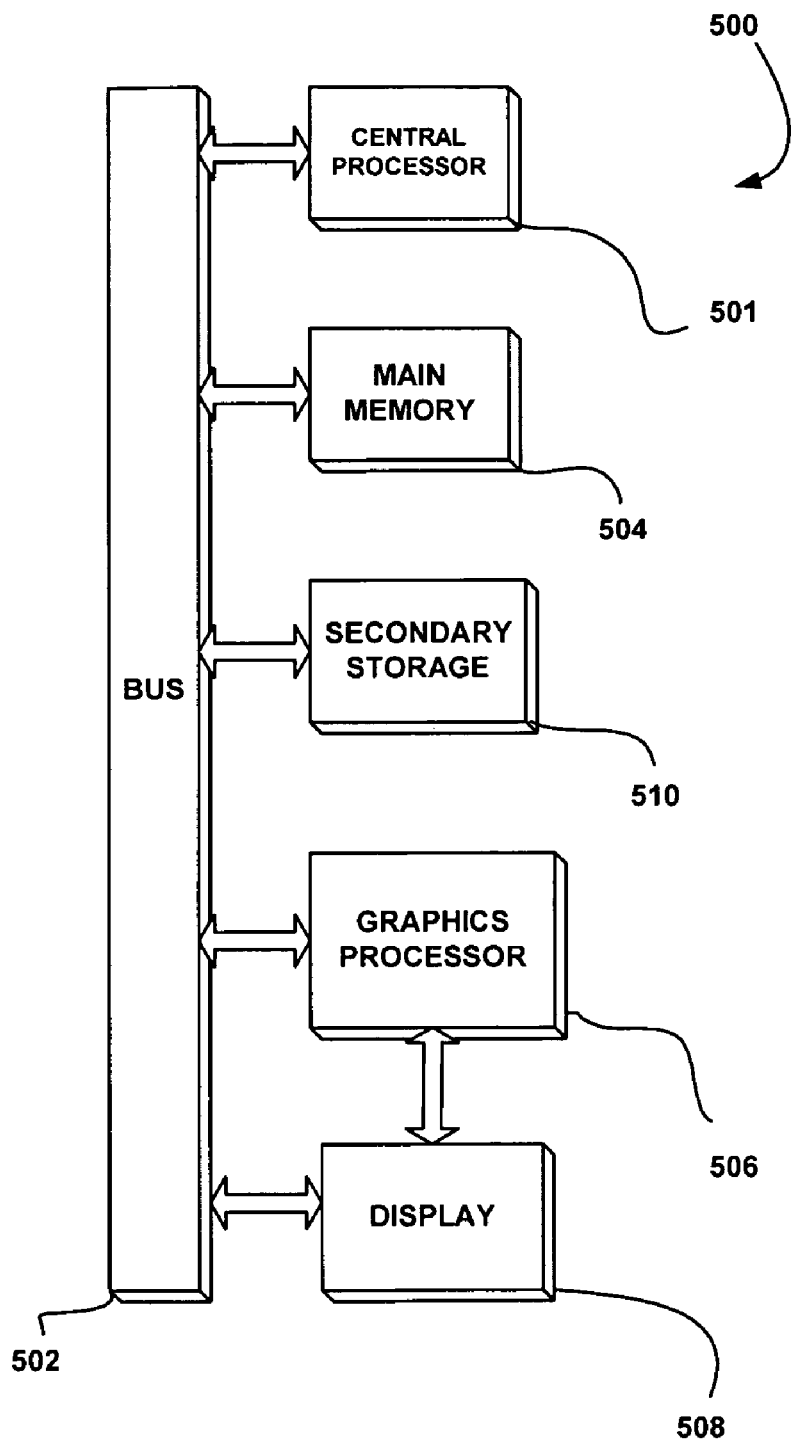
FIG. 5 illustrates an exemplary computer system in which the various architecture and/or functionality of the various previous embodiments may be implemented.

FIG. 5 illustrates an exemplary computer system 500 in which the various architecture and/or functionality of the various previous embodiments may be implemented. As shown, a computer system 500 is provided including at least one host processor 501 which is connected to a communication bus 502. The computer system 500 also includes a main memory 504. Control logic (software) and data are stored in the main memory 504 which may take the form of random access memory (RAM).

The computer system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   determining whether at least one texture retrieval operation is to be performed in a predetermined mode or a non-optimized mode;
   identifying predetermined derivatives, based on the determination that the at least one texture retrieval operation is to be performed in the predetermined mode and not in the non-optimized mode; and
   performing, using a processor, the at least one texture retrieval operation utilizing the predetermined derivatives, based on the determination that the at least one texture retrieval operation is to be performed in the predetermined mode and not in the non-optimized mode;
   wherein the at least one texture retrieval operation avoids caching by using the predetermined derivatives;
   wherein the at least one texture retrieval operation is to be performed by a vertex shader of the processor in the predetermined mode if there is a one-to-one correspondence between an input and an output of the vertex shader processing.

2. The method as recited in claim 1, wherein the predetermined mode includes an optimized mode.

3. The method as recited in claim 1, wherein the determination is made utilizing a data structure.

4. The method as recited in claim 3, wherein the data structure includes a flag.

5. The method as recited in claim 3, wherein the data structure is accessible via an application program interface.

6. The method as recited in claim 1, wherein the predetermined derivatives include predetermined partial derivatives.

7. The method as recited in claim 1, wherein the predetermined derivatives include fixed predetermined derivatives.

8. The method as recited in claim 1, wherein the predetermined derivatives include linear predetermined derivatives.

9. The method as recited in claim 1, wherein the at least one texture retrieval operation is capable of avoiding filtering by using the predetermined derivatives.

10. The method as recited in claim 1, wherein the at least one texture retrieval operation is performed in the predetermined mode when the at least one texture retrieval operation is performed during the course of general purpose computation on a graphics processing unit.

11. The method as recited in claim 1, wherein the at least one texture retrieval operation is performed in the predetermined mode when the at least one texture retrieval operation is performed for utilizing vertex texture arrays.

12. The method as recited in claim 1, wherein the predetermined derivatives are used to identify a width of access associated with the at least one texture retrieval operation.

13. The method as recited in claim 1, wherein the at least one texture retrieval operation is performed utilizing arbitrarily generated derivatives, if it is determined that the at least one texture retrieval operation is not to be performed in the predetermined mode.

14. The method as recited in claim 1, wherein using the predetermined derivatives for the at least one texture retrieval operation avoids caching by using at least one texture associated with a previous frame in lieu of initiating additional texture retrieval operations.

15. The method as recited in claim 1, wherein the determining is made for a plurality of texture retrieval operations associated with a particular frame or scene.

16. The method as recited in claim 1, wherein the predetermination of the derivatives indicates that all subsequent accesses from a particular data stream are to use the predetermined mode.

17. A non-transitory computer readable medium, comprising:
a data structure used to determine whether at least one texture retrieval operation is to be performed in a predetermined mode or a non-optimized mode;
wherein the computer readable medium is utilized such that predetermined derivatives are identified, based on the determination that the at least one texture retrieval operation is to be performed in the predetermined mode and not in the non-optimized mode;
wherein the computer readable medium is utilized such that the at least one texture retrieval operation is performed utilizing the predetermined derivatives, based on the determination that the at least one texture retrieval operation is to be performed in the predetermined mode and not in the non-optimized mode;
wherein the computer readable medium is utilized such that the at least one texture retrieval operation avoids caching by using the predetermined derivatives;
wherein the at least one texture retrieval operation is to be performed by a vertex shader in the predetermined mode if there is a one-to-one correspondence between an input and an output of the vertex shader processing.

18. A system, comprising:
a graphics processor for identifying whether at least one texture retrieval operation is to be performed in a predetermined mode or a non-optimized mode, identifying predetermined derivatives, based on the determination that the at least one texture retrieval operation is to be performed in the predetermined mode and not in the non-optimized mode, and performing the at least one texture retrieval operation utilizing the predetermined derivatives, in the predetermined mode, based on the determination that the at least one texture retrieval operation is to be performed in the predetermined mode and not in the non-optimized mode;
wherein the system is operable such that the at least one texture retrieval operation avoids caching by using the predetermined derivatives;
wherein the at least one texture retrieval operation is to be performed by a vertex shader of the graphics processor in the predetermined mode if there is a one-to-one correspondence between an input and an output of the vertex shader processing.

19. The system as recited in claim 18, wherein the graphics processor is in communication with a display via a bus.

* * * * *